(12) United States Patent
Xu

(10) Patent No.: US 12,041,641 B2
(45) Date of Patent: Jul. 16, 2024

(54) RESOURCE INDICATION METHOD AND TERMINAL DEVICE

(71) Applicant: GUANGDONG OPPO MOBILE TELECOMMUNICATIONS CORP., LTD., Guangdong (CN)

(72) Inventor: Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 380 days.

(21) Appl. No.: 17/399,684

(22) Filed: Aug. 11, 2021

(65) Prior Publication Data

US 2021/0377952 A1 Dec. 2, 2021

Related U.S. Application Data

(63) Continuation of application No. PCT/CN2019/074808, filed on Feb. 11, 2019.

(51) Int. Cl.
*H04W 4/00* (2018.01)
*H04W 72/0446* (2023.01)
(Continued)

(52) U.S. Cl.
CPC ....... *H04W 72/53* (2023.01); *H04W 72/0446* (2013.01); *H04W 72/0453* (2013.01); *H04W 72/23* (2023.01)

(58) Field of Classification Search
CPC ............. H04W 72/53; H04W 72/0446; H04W 72/0453; H04W 72/23; H04W 72/512; H04L 5/0064; H04L 5/0096; H04L 5/0053

(Continued)

(56) References Cited

U.S. PATENT DOCUMENTS 7,164,669 B2 * 1/2007 Li ............................ H04L 5/023
370/347
10,334,612 B2 * 6/2019 Yan ..................... H04W 72/046
(Continued)

FOREIGN PATENT DOCUMENTS

CN 106257958 A 12/2016
CN 107666684 A 2/2018
(Continued)

OTHER PUBLICATIONS

Fujitsu, "Discussion on Preemption Indicator for Multiplexing eMBB and URLLC in Downlink" 3GPP TSG-RAN WG1 Meeting#88 R1-1701920 Athens, Greece Feb. 13-17, 2017. 5 pages.

(Continued)

*Primary Examiner* — Amancio Gonzalez
(74) *Attorney, Agent, or Firm* — Perkins Coie LLP

(57) ABSTRACT

Disclosed are a resource indication method and a terminal device. The method comprises: receiving first indication information, wherein the first indication information is used for indicating the time domain resource and/or the frequency domain resource of preemption transmission, the minimum granularity of the time domain resource is a symbol, and the minimum granularity of the frequency domain resource is a subcarrier or a physical resource block; and based on the first indication information, determining the available resource of a first type of service to be transmitted, wherein the available resource of the first type of service is at least part of the time domain resources excluding the time domain resource of the preemption transmission, and/or at least part of the frequency domain resources excluding the frequency domain resource of the preemption transmission.

9 Claims, 12 Drawing Sheets

---

First indication information is received. The first indication information indicates time domain resources and/or frequency domain resources for preemption transmission. The minimum granularity of the time domain resources is a symbol, and the minimum granularity of the frequency domain resources is a subcarrier or a physical resource block — 21

Based on the first indication information, available resources for at least one of a first type of service or a second type of service to be transmitted are determined — 22

(51) Int. Cl.
*H04W 72/0453* (2023.01)
*H04W 72/23* (2023.01)
*H04W 72/53* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 10,491,263 | B2* | 11/2019 | Zheng | H04W 16/14 |
| 10,701,721 | B2* | 6/2020 | Feng | H04W 72/1273 |
| 10,727,987 | B2* | 7/2020 | Sun | H04L 1/1819 |
| 10,728,002 | B2* | 7/2020 | Islam | H04L 5/0053 |
| 10,764,914 | B2* | 9/2020 | Li | H04W 72/04 |
| 10,932,278 | B2* | 2/2021 | Iyer | H04W 72/04 |
| 10,939,382 | B2* | 3/2021 | Zhou | H04W 52/04 |
| 11,109,411 | B2* | 8/2021 | Li | H04W 74/0808 |
| 11,121,815 | B2* | 9/2021 | Ma | H04L 1/1864 |
| 11,128,502 | B2* | 9/2021 | Zhang | H04L 5/0048 |
| 11,129,155 | B2* | 9/2021 | Zhang | H04L 5/0007 |
| 11,206,643 | B2* | 12/2021 | Hosseini | H04W 72/1268 |
| 11,219,036 | B2* | 1/2022 | Yi | H04L 5/0064 |
| 11,343,056 | B2* | 5/2022 | Liang | H04L 5/0096 |
| 11,343,812 | B2* | 5/2022 | Park | H04W 72/27 |
| 11,357,024 | B2* | 6/2022 | Wong | H04W 72/1273 |
| 11,363,609 | B2* | 6/2022 | Shi | H04W 72/0446 |
| 11,375,502 | B2* | 6/2022 | Shi | H04W 72/0446 |
| 11,378,938 | B2* | 7/2022 | Cella | H04L 1/0002 |
| 11,558,857 | B2* | 1/2023 | Zhou | H04W 72/20 |
| 11,665,777 | B2* | 5/2023 | Balakrishnan | H04W 88/04 370/329 |
| 11,737,114 | B2* | 8/2023 | Park | H04W 72/0446 370/329 |
| 11,758,519 | B2* | 9/2023 | Rudolf | H04W 72/569 455/450 |
| 11,838,100 | B2* | 12/2023 | Tseng | H04L 5/0094 |
| 11,882,561 | B2* | 1/2024 | Liang | H04L 1/1854 |
| 2013/0295978 | A1* | 11/2013 | Ruohonen | H04W 72/04 455/509 |
| 2018/0279326 | A1* | 9/2018 | Park | H04L 5/0096 |
| 2018/0324816 | A1 | 11/2018 | Islam et al. | |
| 2019/0132103 | A1* | 5/2019 | Yang | H04W 72/121 |
| 2019/0306848 | A1* | 10/2019 | Zhou | H04W 72/20 |
| 2020/0029316 | A1* | 1/2020 | Zhou | H04W 74/0833 |
| 2020/0128570 | A1* | 4/2020 | Wong | H04W 72/566 |
| 2021/0058937 | A1 | 2/2021 | Islam et al. | |
| 2022/0083048 | A1* | 3/2022 | Cella | H04W 52/16 |
| 2022/0394739 | A1* | 12/2022 | Choi | H04L 5/0044 |

FOREIGN PATENT DOCUMENTS

| | | |
|---|---|---|
| CN | 108391467 A | 8/2018 |
| CN | 108633023 A | 10/2018 |
| CN | 109302744 A | 2/2019 |
| CN | 109302755 A | 2/2019 |

OTHER PUBLICATIONS

Sequans Communications, "Preemption-based multiplexing of URLLC and eMBB in DL" 3GPP TSG RAN WG1 Meeting #88 R1-1702117 Athens, Greece, Feb. 13-17, 2017. 4 pages.

Vivo, "Summary#3 of UL inter UE Tx prioritization/multiplexing", 3GPP TSG RAN WG1 Meeting Ad-Hoc Meeting 1901 R1-1901457 Taipei, Jan. 21-25, 2019. 54 pages.

Intel Corporation "Downlink multiplexing of eMBB/URLLC transmissions" 3GPP TSG RAN1 WG Meeting #88 R1-1702240 Athens, Greece Feb. 13-17, 2017. 7 pages.

First Office Action of the Chinese application No. 202110801913.3, issued on Nov. 18, 2022. 14 pages with English translation.

International Search Report in the international application No. PCT/CN2019/074808, mailed on Oct. 24, 2019.

Qualcomm Incorporated. "UL Inter-UE Tx Multiplexing and Prioritization", 3GPP TSG-RAN WGI AH-1901 R1-1900900, Jan. 12, 2019 (Jan. 12, 2019), entire document.

3GPP TS 38.213 V16.2.0 (Jun. 2020), 3rd Generation Partnership Project; Technical Specification Group Radio Access Network; NR; Physical layer procedures for control (Release 16).

3GPP TR 22.804 V16.0.0 (Jun. 2018), 3rd Generation Partnership Project; Technical Specification Group Services and System Aspects; Study on Communication for Automation in Vertical Domains (Release 16).

3GPP TR 38.825 V16.0.0 (Mar. 2019), 3rd Generation Partnership Project; Technical Specification Group Radio Access Network; Study on NR Industrial Internet of Things (IOT); (Release 16).

Fujitsu: "Discussion on Preemptio; Hn Indicator Design" R1-1707261; 3GPP TSG RAN WG1 Meeting #89; Hangzhou, P.R. China; May 15-19, 2017. 5 pages with English translation.

First Office Action of the European application No. 19915509.4, issued on Sep. 6, 2022. 7 pages.

English translation of the Written Opinion of the International Search Authority in the international application No. PCT/CN2019/074808, mailed on Oct. 24, 2019. 10 pages with English translation.

Supplementary European Search Report in the European application No. 19915509.4, mailed on Jan. 4, 2022. 10 pages.

Result of consultation of the European application No. 19915509.4, issued on Jan. 31, 2023. 3 pages.

* cited by examiner

| ID7 | ID6 | ID5 | ID4 | ID3 | ID2 | ID1 | ID0 | OCT1 |

FIG. 4

First indication information is transmitted. The first indication information indicates time domain resources and/or frequency domain resources for preemption transmission. The minimum granularity of the time domain resources is a symbol, and the minimum granularity of the frequency domain resources is a subcarrier or a physical resource block / 31

FIG. 6

Second Communication Unit 51

FIG. 8

RESOURCE INDICATION METHOD AND TERMINAL DEVICE

CROSS-REFERENCE TO RELATED APPLICATION

The present application is a continuation of International Application No. PCT/CN2019/074808 filed on Feb. 11, 2019, the disclosure of which is hereby incorporated by reference in its entirety.

TECHNICAL FIELD

The present disclosure relates to the technical field of information processing, and more particularly, to a resource indication method and a terminal device.

BACKGROUND

In $5^{th}$ Generation (5G), there are three application scenarios according to service requirements, i.e., Enhanced Mobile Broadband (EMBB), Mass Machine-like Communication (mMTC), and Ultra-reliable, Low-latency Communication (URLLC). In the URLLC topic of the Release15, high reliability and low delay services are considered and handled. In Release 16 (Rel-16), the object of study is expanded and the concept of a time sensitive network (TSN) network is introduced. Currently, the downlink preemption indication includes two methods. In a first method, 14 bits corresponding to 14 symbol groups indicates whether or not it is preempted. The number of symbols contained in each symbol group is determined by higher layer parameters. The bandwidth of the preemption transmission in the frequency domain is BWP bandwidth. In a second method, the 14 bits corresponding to 7 symbol group*2 bands indicates whether or not it is preempted. The number of symbols contained in each symbol group is determined by higher layer parameters. The frequency domain bandwidth of the preemption transmission is obtained by rounding (BWP/2).

However, the above indication of the preemption transmission is mainly directed to an unpredictable URLLC service, resources occupied by the service are unpredictable, most of which are large bandwidth transmission, and does not apply to a scenario in which an existing TSN service packet is deterministic transmission and the size of which is small. In addition, the unlicensed feedback resource is reserved, which may cause resource waste. Or, the eMBB resource is preempted and the current preemption indication is adopted, thereby causing redundant transmission.

SUMMARY

To solve the above technical problem, embodiments of the present disclosure provide a resource indication method, a terminal device, a network device, and a computer storage medium, a chip, a computer readable storage medium, a computer program product, and a computer program.

According to a first aspect, there is provided a resource indication method applied to a terminal device, the method includes:

receiving first indication information, the first indication information indicates time domain resources and/or frequency domain resources for preemption transmission, a minimum granularity of the time domain resources is a symbol, and a minimum granularity of the frequency domain resources is a subcarrier or a physical resource block; and determining, based on the first indication information, available resources for a first type of service to be transmitted.

The available resources for the first type of service are at least one of: at least part of time domain resources other than the time domain resources for the preemption transmission; or at least part of frequency domain resources other than the frequency domain resources for the preemption transmission.

According to a second aspect, there is provided a resource indication method applied to a network device, the method includes:

transmitting first indication information, the first indication information indicates time domain resources and/or frequency domain resources for preemption transmission, a minimum granularity of the time domain resources is a symbol, and a minimum granularity of the frequency domain resources is a subcarrier or a physical resource block.

According to a third aspect, a terminal device is provided, including: a transceiver; a processor; and a memory for storing a computer program executable by the processor, herein the processor is configured to:

receive first indication information via the transceiver, the first indication information indicates time domain resources and/or frequency domain resources for preemption transmission, a minimum granularity of the time domain resources is a symbol, and a minimum granularity of the frequency domain resources is a subcarrier or a physical resource block; and determine based on the first indication information, available resources for a first type of service to be transmitted.

The available resources for the first type of service are at least one of: at least part of time domain resources other than the time domain resources for the preemption transmission; or at least part of frequency domain resources other than the frequency domain resources for the preemption transmission.

BRIEF DESCRIPTION OF THE DRAWINGS

FIG. 4 is a schematic diagram of a Media Access Control (MAC) Control Element (CE) format according to an embodiment of the present disclosure;

FIG. 6 is a third schematic flowchart of a resource indication method according to an embodiment of the present disclosure;

FIG. 8 is a schematic structural diagram of a network device according to an embodiment of the present disclosure;

DETAILED DESCRIPTION

In order to understand the features and technical contents of the embodiments of the present disclosure in more detail, the implementation of the embodiments of the present disclosure will be described in detail with reference to the accompanying drawings, which are provided for purposes of illustration only and are not intended to limit the embodiments of the present disclosure.

The technical solution in the embodiments of the present disclosure will be described with reference to the accompanying drawings of the embodiments of the present disclosure. It is apparent that the described embodiments are a part of the embodiments, not all of the embodiments. Based on the embodiments in the present disclosure, all other embodiments obtained by a person skilled in the art without creative effort fall within the protection scope of the present disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system, a 5G system and the like.

Figure 1A:
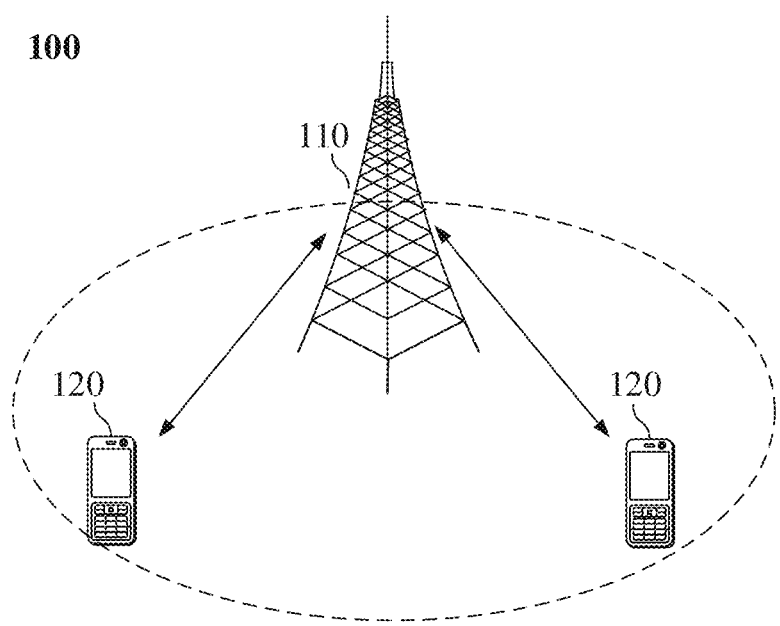
FIG. 1A is a first schematic diagram of a communication system architecture according to an embodiment of the present disclosure.

Exemplarily, communication system 100 to which the embodiments of the present disclosure is applied may be illustrated in FIG. 1A. The communication system 100 may include a network device 110, which may be a device communicating with a UE 120 (also referred to as a communication terminal, terminal). The network device 110 may provide communication coverage for a specific geographic area and may communicate with UEs located within the coverage area. Alternatively, the network device 110 may be a Base Transceiver Station (BTS) in a GSM system or a CDMA system, a NodeB (NB) in a WCDMA system, or a radio controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a future evolved Public Land Mobile Network (PLMN), and the like.

The communication system 100 also includes at least one UE120 located within the coverage of the network device 110. The "UE" used herein includes, but is not limited to, connection via wired lines, such as Public Switched Telephone Networks (PSTN), Digital Subscriber Line (DSL), digital cables, direct cable connections; and/or another data connection/network; and/or via a wireless interface, such as for a cellular network, a Wireless Local Area Network (WLAN), a digital television network such as DVB-H network, a satellite network, a AM-FM broadcast transmitter; and/or means of another UE arranged to receive/transmit communication signals; and/or Internet of Things (IoT) devices. A UE configured to communicate via a wireless interface may be referred to as a "wireless communication terminal", "wireless terminal" or "mobile terminal". Examples of mobile terminals include, but are not limited to, satellite or cellular telephones; a Personal Communications System (PCS) terminal that may combine a cellular radio telephone with data processing, facsimile, and data communication capabilities; a PDA that may include a radio telephone, a pager, Internet/Intranet access, a Web browser, a notebook, a calendar, and/or a Global Positioning System (GPS) receiver; and conventional laptop and/or palmtop receivers or other electronic devices including radio telephone transceivers. The terminal device may refer to an access terminal, a User Equipment (UE), a subscriber unit, a subscriber station, a mobile station, a rover station, a remote station, a remote terminal, a mobile device, a user terminal, a terminal, a wireless communication device, a user agent, or a user device. The access terminal may be a cellular telephone, a cordless telephone, a Session Initiation Protocol (SIP) telephone, a Wireless Local Loop (WLL) station, a Personal Digital Assistant (PDA), a handheld device having a wireless communication function, a computing device or other processing device connected to a wireless modem, an in-vehicle device, a wearable device, a terminal device in a 5G network, a terminal device in a future evolved PLMN, or the like.

Optionally, Device to Device (D2D) communication may be performed between the terminal devices 120.

Optionally, the 5G system or 5G network may also be referred to as a New Radio (NR) system or NR network.

FIG. 1A illustrates one network device and two terminal devices. Optionally, the communication system 100 may include a plurality of network devices and other numbers of terminal devices may be included within the coverage area of each network device, which is not limited by the embodiments of the present disclosure.

Alternatively, the communication system 100 may further include other network entities such as a network controller, a mobility management entity, and the like, which are not limited in the embodiments of the present disclosure.

It is to be understood that a device having a communication function in a network/system in an embodiment of the present disclosure may be referred to as a communication device. Taking the communication system 100 illustrated in FIG. 1 as an example, the communication device may include a network device 110 and a terminal device 120 having a communication function, and the network device 110 and the terminal device 120 may be specific devices described above, and details are not described herein. The communication device may also include other devices in the communication system 100, such as network controllers, mobility management entities, and other network entities, which are not limited in the embodiments of the present disclosure.

The embodiments of the present disclosure are mainly used for services with high reliability and low delay, such as TSN network services. With respect to the TSN network, the 5G network will serve the TSN network and services as a TSN bridge (see FIG. 1B). The NR system needs to support that data packets with Ethernet frame structure can be transmitted using the 5G network, and the QoS requirements required in the TR 22.804 is also required to be ensured to provide higher reliability and lower delay guarantee. Also, it is also necessary to take into account the high clock synchronization accuracy requirements required in TR 22.804, such as 1 us. In SA2 TR 22.804, specific service characteristics and QoS requirements are defined. a typical use case and scenario (see Table 1), are written into TR 38.825.

TABLE 1

| Scene | Terminal device | Efficient communication service | Transmission period | Allowable end-to-end delay | Survival time | Packet size | Service area | Service periodity | Use scenario |
|---|---|---|---|---|---|---|---|---|---|
| I | 20 | 99.9999% to 99.999999% | 0.5 ms | ≤Transmission period | Transmission period | 50 bytes | 15 m × 15 m × 3 m | Period | Motion control and control to control scene |
| II | 50 | 99.9999% to 99.999999% | 1 ms | ≤Transmission period | Transmission period | 40 bytes | 10 m × 5 m × 3 m | Period | Motion control and control to control scene |
| III | 100 | 99.9999% to 99.999999% | 2 ms | ≤Transmission period | Transmission period | 20 bytes | 100 m × 100 m × 30 m | Period | Motion control and control to control scene |

Figure 1B:
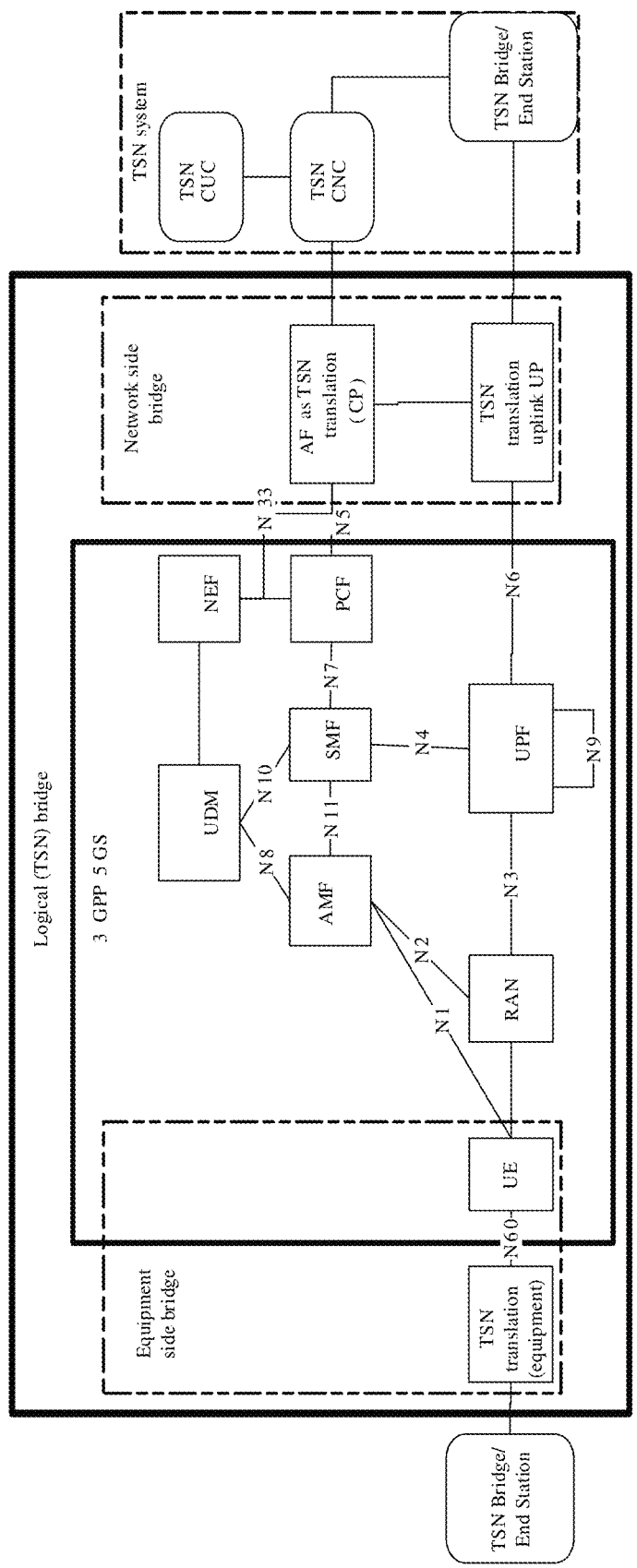
FIG. 1B is a schematic diagram of TSN network architectures.

As can be seen from the above table, the TSN service is a deterministic service, its period, delay, packet size requirements are different, and the packets are generally smaller, such as 20 to 50 bytes, and the delay and reliability requirements are higher, e.g., performing ultra-high reliability (e.g., 99.999%) transmission within 1 ms. In order to achieve this target, a Preemption is currently introduced in the downlink for the inter-UE resource collision scenario, that is, the URLLC service is inserted during the transmission of the eMBB service, as illustrated in FIG. 1B. Since the eMBB UE does not know that the URLLC service is inserted, the URLLC data is demodulated as the eMBB data, thereby seriously affecting the demodulation performance of the eMBB data. In order to reduce the influence of the URLLC on the eMBB, a signaling, i.e. the preemption indicator is introduced, the signaling is used to tell the terminal which resources are occupied by the URLLC. The signaling indicates the time and frequency domain preemption detail in the bitmap manner.

It is to be understood that the terms "system" and "network" are used interchangeably herein. The term "and/or" as used herein, is merely an association that describes an associated object, meaning that there may be three relationships, e.g., A and/or B, which may mean that A alone, both A and B, and B alone, are present. In addition, the character "/" as used herein generally indicates that the relationship between objects before and after "/" is "or".

In order that the features and technical contents of the embodiments of the present disclosure may be more fully understood, an implementation of the embodiments of the present disclosure will be described in detail with reference to the accompanying drawings, which are provided for purposes of illustration only and are not intended to limit the embodiments of the present disclosure.

First Embodiment

Figure 2:
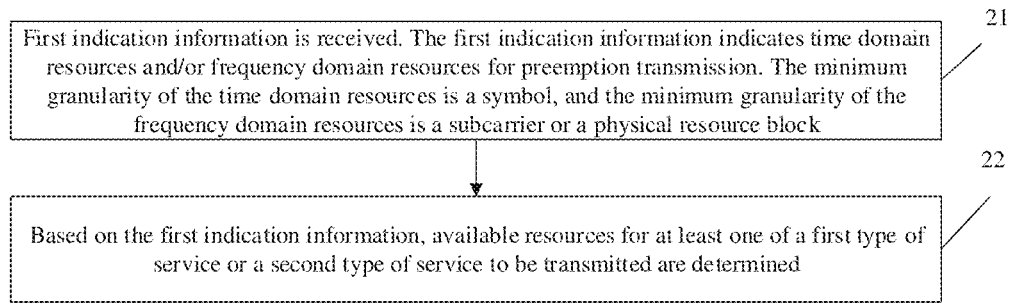
FIG. 2 is a first schematic flowchart of a resource indication method according to an embodiment of the present disclosure.

In an embodiment of the present disclosure, a resource indication method is provided which is applied to a terminal device. As illustrated in FIG. 2, the method includes the following operations In an operation 21, first indication information is received. The first indication information indicates time domain resources and/or frequency domain resources for preemption transmission. The minimum granularity of the time domain resources is a symbol, and the minimum granularity of the frequency domain resources is a subcarrier or a physical resource block; and In an operation 22, based on the first indication information, available resources for at least one of a first type of service or a second type of service to be transmitted are determined.

The available resources for the second type of service are at least one of: at least part of time domain resources other than the time domain resources for the preemption transmission; or at least part of frequency domain resources other than the frequency domain resources for the preemption transmission. The available resources for the first type of service at least include at least one of: at least part of the time domain resources for the preemption transmission; or at least part of the frequency domain resources for the preemption transmission.

It is also to be noted that the available resources for the first type of service may further include at least part of other non-overlapping time domain resources and/or at least part of other non-overlapping frequency domain resources.

In this embodiment, the first type of service may be a service of a time sensitive network (TSN), a service of an ultra-reliable, low-latency communication (URLLC) type, or a service of another network. The solution of this embodiment is particularly applicable to the service of the TSN network. The second type of service may be at least one of a voice service, a eMBB service, or a TSN service. It is to be noted that the priority of the TSN service in the first type of service is higher than the priority of the TSN service in the second type of service. Or, the QoS requirement for the TSN service in the first type of service is higher than the QoS requirement for the TSN service in the second type of service. Or, the TSN service in the first type of service and the TSN service in the second type of service belong to different categories.

Figure 3:
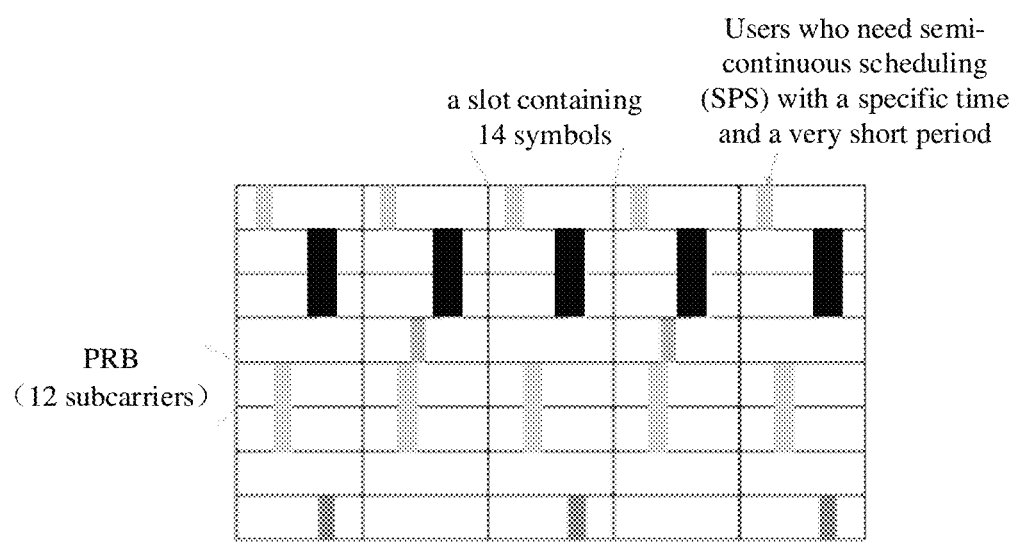
FIG. 3 is a schematic diagram of an indication granularity.

For the first type of service, the frequency granularity of the exist preemption indication is very coarse, which is the entire transmission bandwidth or half of the transmission bandwidth. However, the TSN service usually occupies only a small part of the transmission bandwidth due to its specificity of the packet, such as the subcarrier level, PRB level, as illustrated in FIG. 3. The frequency preemption indication with the coarse granularity brings a redundancy indication, restricts the transmission resources that the eMBB service may use, reduces unnecessary resource waste, and is not applicable to the first type of service, such as the TSN service with packet deterministic transmission and smaller packet, On the other hand, since a first type of service, such as a TSN/URLLC service, has at least one of the following features: A packet arrival deterministic, a smaller packet, and a smaller period, if Semi-persistent scheduling (SPS)/configured resources (CG) are used to configure the resources to be used for the transmission of the first type of service, the entire resources for the BandWidth Part (BWP) are scattered, so that the resources dynamically scheduled by the Physical Downlink Control Channel (PDCCH) are scattered, and the scheduled PDSCH resources are small, thereby increasing the scheduling overhead of the PDCCH.

The solution provided in this embodiment may be applicable to resource preemption in the user equipment (intra-UE), such as between dynamic and dynamic, between dynamic and SPS, between SPS and SPS, between dynamic and CG, between CG and dynamic, and the like. Specifically, the SPS resource of UE1 preempts part of the time and frequency resource location allocated by the dynamic scheduling of UE1. It is also applicable to resource preemption between user equipment (inter-UE), for example, SPS resource of UE1 preempts part of time and frequency resource locations allocated by dynamic scheduling of UE2.

The operation of receiving the first indication information includes that the first indication information is acquired through one of an RRC message, an MAC CE, or DCI.

The first indication information sent from a network side is received, that is, time domain and/or frequency domain resources for preemption transmission configured by the network for a terminal device are acquired. The time domain and/or frequency domain resources for the preemption transmission are used to indicate preempted (unusable) time and frequency resources among time and frequency resources that have been, or are to be, configured or indicated. The minimum granularity in the granularities of the time domain resource indication may be a symbol level, a slot level, or a subframe level. The minimum granularity among the granularities of the frequency domain resource indication may be at the subcarrier level (SC level) or at the physical resource block level (PRB level). Further, the granularity may be a group level, such as a symbol group level, a subcarrier group level.

The time domain resources and/or the frequency domain resources for the preemption transmission are at least one of: at least part of semi-static resources; or at least part of dynamic resources.

Specifically, the time-domain and/or frequency domain resources for the preemption transmission may be the same as the semi-static resource allocation or may be a part of the semi-static resources, such as an ACK/NACK feedback time and frequency resources corresponding to grant free, time and frequency resources of downlink SPS, or a time and frequency resource of uplink CG. Alternatively, the time domain and/or frequency domain resources for the preemption transmission may be the same as or part of dynamic resources.

In the time domain resources and the frequency domain resources for the preemption transmission, the frequency domain resources for the preemption transmission are at least one of a discontinuous frequency domain resource or a frequency domain resource in which at least one granularity exists; and/or the time domain resources for the preemption transmission are at least one of discontinuous time domain resources, and/or or time domain resources in which at least one granularity exists.

The time domain resources for the preemption transmission may not be continuous, and/or the granularities for the preemption indication may be different, such as symbol 1, symbol 14; or symbol 1, symbols 4-6.

The frequency domain resources for the preemption transmission may not be continuous, and/or the granularities of the preemption indication may be different, such as, subcarrier 1, subcarriers 2-3; or, subcarrier 1 of PRB1, PRB2.

The first indication information includes at least one of:
a period and a time domain offset of at least one set of time domain resources and/or frequency domain resources for the preemption transmission; or
at least one set of transmission resource patterns for the preemption transmission.

It is to be noted that in the first indication information, the time domain resources and the frequency domain resources for the preemption transmission may be respectively indicated by different information elements, or combinations of multiple sets of time domain resources and frequency domain resources may be indicated by the first indication information. For example, the time domain resources for the preemption transmission and the frequency domain resources for the preemption transmission are individually indicated to the terminal device. For example, the base station indicates what resources are occupied in the time domain firstly, then the base station indicates what resources are occupied in the frequency domain. Alternatively, the time domain resources for the preemption transmission and the frequency domain resources for the preemption transmission are indicated as a combination to the terminal device, for example, the base station indicates what resources are occupied in time and frequency domains.

The period and the time domain offset and/or a frequency domain offset of the time domain resources and/or frequency domain resources for the preemption transmission may be indicated by a network side, such as a base station, to a terminal device via the first indication information. Of course, the transmission resource pattern may also be indicated to the terminal device via the first indication information.

For example, in a case that the base station indicates a period and a time domain offset of the resources for the preemption transmission: for SPS configuration, the period is 1 slot, occupied frequency domain resources are PRB1, the time domain offset is 2 symbols, the time domain length is 2 symbols, and for the preemption indication, the period is 2 slot, occupied frequency domain resources are subcarrier 1 of the PRB1, time domain offset is 2 symbols, and time domain length is 1 symbols.

For another example, the base station indicates a resource pattern for the preemption transmission, taking a bandwidth 6 PRB as an example:
{PRB}　　{SC}　　{symbol}:　　{1} {001000000000000000000000000}, or
　{1}　　　　　　　　　　　{010000000000} {001000000000000000000000000}, or
　{010000}　　　　　　　　　{010000000000} {001000000000000000000000000}, or
　{001000000000000000000000000}.

Further, in an example, the base station indicates: a period and/or a time domain offset, or at least one transmission resource pattern, of at least one group resources for the preemption transmission. Typically, the base station indicates the period and/or time domain offset, or the transmission resource pattern, of at least one group resources for the preemption transmission through, for example, a dedicated message such as a RRC message or a broadcast message. Alternatively, the base station further indicates, through a dedicated message, such as a MAC CE or a physical layer signaling, the period and/or time domain offset, or the transmission resource pattern, of one or more groups of resources to be finally activated in multiple groups of resources for the preemption transmission.

The time domain resources and/or the frequency domain resources for the preemption transmission indicated in the first indication information are for one of a terminal device, a user group, and a cell. For example, the time domain resources and/or the frequency domain resources for the preemption transmission may be indicated by the base station to the UE by means of group scheduling, such as group x-RNTI.

The terminal device receives the time domain and/or frequency domain resource configuration for the preemption transmission configured by the network. The terminal device receives a dedicated signaling, such as at least one of RRC message, MAC CE or DCI from the network to obtain time domain and frequency domain resource configuration for the preemption transmission.

Further, the terminal device acquires a period and/or a time domain offset, or a transmission resource pattern, of resources for the preemption transmission. Similarly, the UE acquires the period and/or the time domain offset, or the transmission resource pattern, of resources for the preemption transmission through, for example, a dedicated message such as an RRC message or a broadcast message.

The method further includes that second indication information is received.

The second indication information indicates or includes one or more sets of time domain resources and/or frequency domain resources to be activated for the preemption transmission.

The operation of receiving the second indication information may include:

an operation that the second indication information is acquired through one of an RRC message, an MAC CE, or DCI.

The operation of determining the available resources of the second type of service to be transmitted includes:

an operation of determining the available resources for the second type of service to be transmitted from resources other than the at least one set of time domain resources to be activated and/or frequency domain resources to be activated for the preemption transmission indicated in the second indication information.

That is, the terminal device further obtains actually preempted time and frequency resources or an actually preempted resource pattern through a dedicated message, such as an MAC CE or a physical layer signaling.

In combination, the first indication information is acquired through, for example, the dedicated message such as an RRC message or a broadcast message, and though the first indication information, the period and/or the time domain offset, or the transmission resource pattern, of at least one group of resources for the preemption transmission configured by the network side may be acquired. For example, the index of each group is also carried in the RRC message or the broadcast message.

The second indication information is acquired through an dedicated message, such as an MAC CE or a physical layer signaling, and through the second indication information, a period and/or time domain offset of one or more sets of resources to be activated finally for the preemption transmission in the at least one set of transmission resources included in the first indication information may be determined. Alternatively, through the second indication information, a transmission resource pattern to be activated or to be used is determined from the at least one transmission resource pattern included in the first indication information. For example, the index to be activated finally may be carried in the MAC CE or the physical layer signaling.

It is to be noted that the network device may indicate only the first indication information, and the terminal device acquires information about time domain resources and/or frequency domain resources, or a transmission pattern, for the preemption transmission according to the first indication information, and determines available resources for the second type of service to be transmitted outside the resources for the preemption transmission.

Further, the available resources for the first type of service to be transmitted may be determined by receiving the second indication information.

Figure 4:
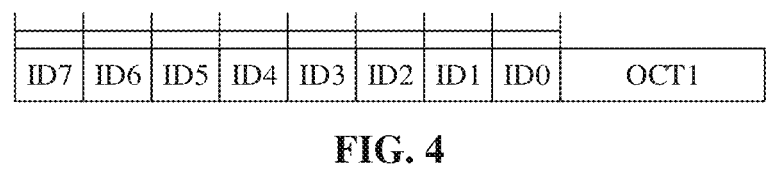

As illustrated in FIG. 4, an alternative example of an activation indication method using the MAC CE is shown. In FIG. 4, Idi represents a period and a time domain offset of the group of preemption transmission resources of which the index is i, or a transmission resource pattern of which the index is i.

Here, a new logical channel identification (LCID) is introduced to indicate that the function of the MAC CE is to indicate the period and time domain offset, or the transmission resource pattern, of the resources to be activated/deactivated for the preemption transmission. The value at each position indicates whether the corresponding resources for the preemption transmission are to be activated, and the activation or deactivation corresponding to the specific value may be set according to the actual situation. For example, it may be set that when the value at the corresponding position is 1, it may indicate that the corresponding resources are to be activated or to be actually used, or that the corresponding resources are to be preempted, and when the value at the corresponding position is 0, it may represent that the corresponding resources are to be deactivated, or not to be actually used, or that the corresponding resources are not to be preempted.

It is also to be noted that the at least one group of the time domain resources to be activated and/or frequency domain resources to be activated for the preempt transmission in the second indication information is for one of a terminal device, a user group, or a cell. Details are not described herein.

Further, the terminal device determines the resources available for the current transmission according to the time domain and frequency domain resource configuration for the preemption transmission configured and/or indicated in the second indication information. The available resources for the current transmission are some or all of the resources other than the preemption indication. Specifically, whether the current position is used for transmission may be determined based on whether the configured CG/SPS position, the position for transmitting the eMBB PUCCH, or the already indicated dynamically scheduled position is preempted. If preempted, the transmission may be performed in a manner such as the puncture/rate-matching/pre-emption. If not preempted, the transmission may be performed according to the position of the configured CG/SPS or the position for transmitting the eMBB PUCCH, the resources indicated by the dynamic scheduling. For example, if some of the CG/SPS resources configured for the voice service of the UE1 are determined to be preempted according to the first indication information and/or the second indication information, the remaining CG/SPS resources other than the resources to be preempted are available resources for the current transmission, and the UE1 transmits the voice service in a manner such as the puncture/rate-matching/pre-emption. For another example, if some of the resources dynamically scheduled for the eMBB service of the UE2 are preempted according to the first indication information and/or the second indication information, the remaining resources dynamically scheduled other than the resources to be preempted are available resources for current transmission, and the UE2 transmits the eMBB service in a manner such as the puncture/rate-matching/pre-emption.

Based on the foregoing solution, in the present embodiment, the third indication information may further be acquired through one of an RRC message, an MAC CE, or DCI. In particular, the method further includes:

an operation that the third indication information is received. The third indication information indicates activation moments or starting use moments for at least one of: the time domain resources and/or the frequency domain resources for the preemption transmission; or the at least one set of time domain resources to be activated and/or frequency domain resources to be activated for the preemption transmission.

That is, in addition to configuring the time domain resource and/or the frequency domain resource through the first indication information, and/or indicating the time domain resource to be activated or used and/or the frequency domain resource to be activated or used through the second indication information, the starting use moments for the resources indicated in the first indication information may be indicated or indicated individually though the third indication information, and/or the activation starting moments for one or more groups of time domain/frequency domain resources indicated in the second indication information may indicated though the third indication information. For example, the first indication information indicates the time domain resources 1, 2, and 3, and the frequency domain resources 1, 2, and 3. Then, the third indication information indicates the starting use moments for the time domain resources 1, 2, and 3, and the starting use moments of the frequency domain resources 1, 2, and 3, respectively. Alternatively, if the second indication information indicates that the time domain resource 1 and the frequency domain resource 1 are to be activated, the activation start moments for the time domain resource 1 and the frequency domain resource 1 may be indicated by the third indication information. In combination with the third indication information, the activation moment or starting use moment for each time domain resource and/or frequency domain resource for the preemption transmission can be obtained more clearly, so that the time domain and/or frequency domain transmission positions of available resources can be determined more accurately.

The resources with the activation moments or starting use moments indicated in the third indication information are also for one of the terminal device, the user group, or the cell.

Figure 5:
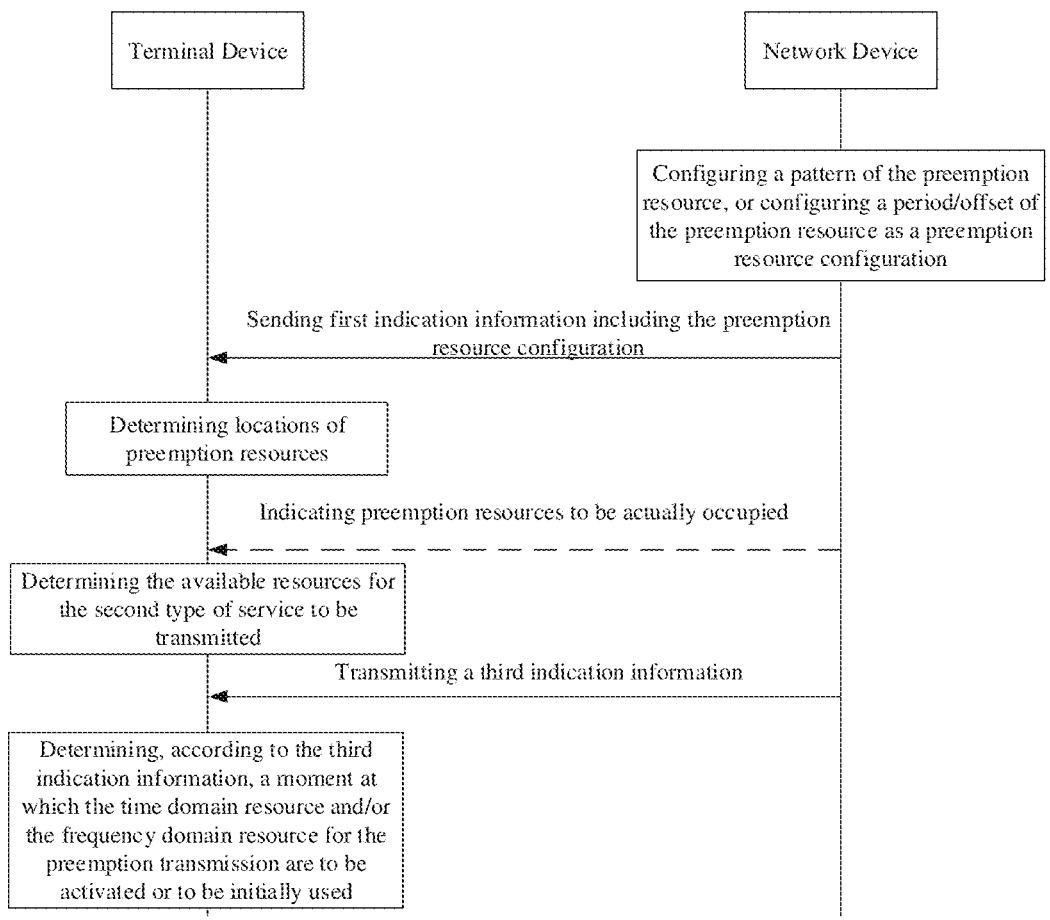
FIG. 5 is a second schematic flowchart of a resource indication method according to an embodiment of the present disclosure.

The solution provided in this embodiment will be further described below with reference to FIG. 5.

A network device, such as a base station, configures a preemption resource pattern, or configures a period/offset of the preemption resource as a preemption resource configuration, and generates first indication information based on the preemptive resource configuration.

The network device sends first indication information including the preemption resource configuration to the terminal device.

The terminal device determines locations of preemption resources according to the first indication information.

The network device sends second indication information to the terminal device, and indicates preemption resources to be actually occupied to the terminal device through the second indication information. The preemption resources to be actually occupied may be understood as preemption resources to be actually activated.

The terminal device determines the available resources for the second type of service to be transmitted based on the second indication information.

The network device sends third indication information to the terminal device.

The terminal device determines, according to the third indication information, a moment at which the time domain resource and/or the frequency domain resource for the preemption transmission are to be activated or to be initially used.

It can be seen that with the above solution, it is possible to obtain positions of time domain resources and/or frequency domain resources for the preemption transmission with a smaller granularity, and further determine available resources for transmission of the second type of service based on the positions of time domain resources and/or frequency domain resources for the preemption transmission. In this way, by indicating the positions of the time domain resource and/or the frequency domain resource for the preemption transmission at one time, the problem of redundancy indication caused by frequent preemption indication is avoided, and unnecessary resource waste is reduced. It is also possible to avoid the problem that the resources dynamically scheduled by the PDCCH are scattered, and to avoid the problem that the scheduled resources are small, thereby reducing the scheduling overhead of the PDCCH and improving the resource use efficiency.

Second Embodiment

In an embodiment of the present disclosure, a resource indication method is provided which is applied to a network device. As illustrated in FIG. 6. the method includes the following operation.

In an operation 31, first indication information is transmitted. The first indication information indicates time domain resources and/or frequency domain resources for preemption transmission. The minimum granularity of the time domain resources is a symbol, and the minimum granularity of the frequency domain resources is a subcarrier or a physical resource block.

In this embodiment, a first type of service may be a service of a time sensitive network (TSN), a service of an ultra-reliable, low-latency communication (URLLC) type, or a service of another network. The solution of this embodiment is particularly applicable to the service of the TSN network. A second type of service may be at least one of a voice service, a eMBB service, or a TSN service. It is to be noted that the priority of the TSN service in the first type of service is higher than the priority of the TSN service in the second type of service. Or, the QoS requirement for the TSN service in the first type of service is higher than the QoS requirement for the TSN service in the second type of service. Or, the TSN service in the first type of service and the TSN service in the second type of service belong to different categories.

The operation of transmitting the first indication information includes:

an operation that the first indication information is transmitted through one of an RRC message, an MAC CE, or DCI.

Time domain and/or frequency domain resources for the preemption transmission are configured by the network for a terminal device. The time domain and/or frequency domain resources for the preemption transmission are used to indicate preempted (unusable) time and frequency resources in time and frequency resources that have been, or are to be, configured or indicated. The minimum granularity among the granularities of the time domain resource indication may be a symbol level, a slot level, or a subframe level. The minimum granularity among the granularities of the frequency domain resource indication may be at the subcarrier level (SC level) or at the physical resource block level (PRB level). Further, the granularity may be a group level, such as a symbol group level, a subcarrier group level.

The time domain resources and/or the frequency domain resources for the preemption transmission are at least one of: at least part of semi-static resources; or at least part of dynamic resources.

Specifically, the time domain and/or frequency domain resources for the preemption transmission may be the same as the semi-static resource allocation or may be a part of the semi-static resources, such as an ACK/NACK feedback time and frequency resources corresponding to grant free, time and frequency resources of downlink SPS, or time and frequency resources of uplink CG. Alternatively, the time domain and/or frequency domain resources for the preemption transmission may be the same as or part of dynamic resources.

In the time domain resources and the frequency domain resources for the preemption transmission, the frequency domain resources for the preemption transmission are at least one of a discontinuous frequency domain resource or a frequency domain resource in which at least one granularity exists; and/or the time domain resources for the preemption transmission are at least one of discontinuous time domain resources, or or time domain resources in which at least one granularity exists.

The time domain resources for the preemption transmission may not be continuous, and/or the granularities for the preemption indication may be different, such as symbol 1, symbol 14; or, symbol 1, symbols 4-6.

The frequency domain resources for the preemption transmission may not be continuous, and/or the granularities of the preemption indication may be different, such as, subcarrier 1, subcarriers 2-3; or, subcarrier 1 of PRB1, PRB2.

The first indication information includes at least one of:

a period and a time domain offset of at least one set of time domain resources and/or frequency domain resources for the preemption transmission; or at least one set of transmission resource patterns for the preemption transmission.

It is to be noted that in the first indication information, the time domain resources and the frequency domain resources for the preemption transmission may be respectively indicated by different information elements, or combinations of multiple sets of time domain resources and frequency domain resources may be indicated by the first indication information. For example, the time domain resources for the preemption transmission and the frequency domain resources for the preemption transmission are individually indicated to the terminal device. For example, the base station indicates what resources are occupied in the time domain firstly, then the base station indicates what resources are occupied in the frequency domain. Alternatively, the time domain resources for the preemption transmission and the frequency domain resources for the preemption transmission are indicated as a combination to the terminal device, for example, the base station indicates what resources are occupied in time and frequency domains.

The period and the time domain offset and/or a frequency domain offset of the time domain resources and/or frequency domain resources for the preemption transmission may be indicated by a network side, such as a base station, to the terminal device via the first indication information. Of course, the transmission resource pattern may also be indicated to the terminal device via the first indication information.

For example, in a case that the base station indicates that a period and a time domain offset of the resources for the preemption transmission: for SPS configuration, the period is 1 slot, occupied frequency domain resources are PRB1, the time domain offset is 2 symbols, the time domain length is 2 symbols, and for the preemption indication, the period is 2slot, occupied frequency domain resources are subcarrier 1 of the PRB1, time domain offset is 2 symbols, and time domain length is 1 symbols.

For another example, the base station indicates a resource pattern for the preemption transmission, taking a bandwidth 6 PRB as an example:

{PRB}   {SC}   {symbol}:   {1}
  {1}{001000000000000000000000000}, or
{1}   {010000000000}
  {001000000000000000000000000}, or
{010000}   {010000000000}
  {001000000000000000000000000}, or
{001000000000000000000000000}.

Further, the network device indicates: a period and/or a time domain offset, or at least one transmission resource pattern, of at least one group resources for the preemption transmission. Typically, the base station indicates the period and/or time domain offset, or the transmission resource pattern, of at least one group resources for the preemption transmission through, for example, a dedicated message such as a RRC message or a broadcast message. Alternatively, the base station further indicates, through a dedicated message, such as a MAC CE and a physical layer signaling, the period and/or time domain offset, or the transmission resource pattern, of one or more groups of resources to be finally activated in multiple groups of resources for the preemption transmission.

The time domain resources and/or the frequency domain resources for the preemption transmission indicated in the first indication information are for one of a terminal device, a user group, and a cell. For example, the time domain resources and/or the frequency domain resources for the preemption transmission may be indicated by the base station to the UE by means of group scheduling, such as group x-RNTI.

The method further includes that second indication information is transmitted. The second indication information indicates or includes one or more sets of time domain resources and/or frequency domain resources to be activated for the preemption transmission.

The operation of transmitting the second indication information may include:

an operation that the second indication information is transmitted through one of an RRC message, an MAC CE, and DCI.

That is, the terminal device further obtains the actually preempted time and frequency resources or resource pattern through a dedicated message, such as an MAC CE or a physical layer signaling.

In combination, the first indication information is acquired through, for example, the dedicated message such as an RRC message or a broadcast message, and though the first indication information, the period and/or the time domain offset, or the transmission resource pattern, of at least one group of resources for the preemption transmission configured by the network side is/are acquired. For example, the index of each group is carried in such as an RRC message or a broadcast message.

The second indication information is acquired through an dedicated message, such as an MAC CE or a physical layer signaling, and through the second indication information, a period and/or time domain offset of one or more sets of resources to be activated finally for the preemption transmission in the at least one set of transmission resources included in the first indication information is/are determined. Alternatively, through the second indication information, the transmission resource pattern to be activated or to be used is determined from the at least one transmission resource pattern included in the first indication information. For example, the index to be activated finally may be carried in a MAC CE or a physical layer signaling.

As illustrated in FIG. 4, an alternative example of an activation indication method using the MAC CE is shown. In FIG. 4, Idi represents a period and a time domain offset of the group of preemption transmission resources of which the index is i, or a transmission resource pattern of which the index is i.

Here, a new logical channel identification (LCID) is introduced to indicate that the function of the MAC CE is to indicate the period and time domain offset, or the transmission resource pattern, of the resources to be activated/deactivated for the preemption transmission. The value at each position indicates whether the corresponding resources for the preemption transmission are to be activated, and the activation or deactivation corresponding to the specific value may be set according to the actual situation. For example, it may be set that when the value at the corresponding position is 1, it may indicate that the corresponding resources are to be activated or to be actually used, or that the corresponding resources are to be preempted, and when the value at the corresponding position is 0, it may represent that the corresponding resources are to be deactivated, or not to be actually used, or that the corresponding resources are not to be preempted.

It is also to be noted that the at least one group of the time domain resources to be activated and/or frequency domain resources to be activated for the preempt transmission in the second indication information is for one of a terminal device, a user group, and a cell. Details are not described herein.

Based on the foregoing solution, in the present embodiment, third indication information may further be transmitted through one of an RRC message, an MAC CE, and DCI. In particular, the method further includes:

an operation that the third indication information is transmitted. The third indication information indicates activation moments or starting use moments for at least one of: the time domain resources and/or the frequency domain resources for the preemption transmission; or the at least one set of time domain resources to be activated and/or frequency domain resources to be activated for the preemption transmission.

That is, in addition to configuring the time domain resource and/or the frequency domain resource through the first indication information, and then indicating the time domain resource to be activated or used and/or the frequency domain resource to be activated or used through the second indication information, the starting use moments for the resources indicated in the first indication information may be indicated respectively though the third indication information, and/or the activation starting moments for one or more groups of time domain/frequency domain resources indicated in the second indication information may indicated though the third indication information. For example, the first indication information indicates the time domain resources 1, 2, and 3, and the frequency domain resources 1, 2, and 3. Then, the third indication information indicates the starting use moments for the time domain resources 1, 2, and 3, and the starting use moments of the frequency domain resources 1, 2, and 3, respectively. Alternatively, if the second indication information indicates that the time domain resource 1 and the frequency domain resource 1 are to be activated, the activation start moments for the time domain resource 1 and the frequency domain resource 1 may be indicated by the third indication information. In combination with the third indication information, the activation moment or starting use moment for each time domain resource and/or frequency domain resource for the preemption transmission can be obtained more clearly, so that the time domain and/or frequency domain transmission positions of available resources can be determined more accurately.

The resources with the activation moments or starting use moments indicated in the third indication information are also for one of the terminal device, the user group, or the cell.

It can be seen that with the above solution, it is possible to obtain positions of time domain resources and/or frequency domain resources for the preemption transmission with a smaller granularity, and further determine available resources for transmission of the second type of service based on the positions of time domain resources and/or frequency domain resources for the preemption transmission. In this way, by indicating the positions of the time domain resource and/or the frequency domain resource for the preemption transmission at one time, the problem of redundancy indication caused by frequent preemption indication is avoided, and unnecessary resource waste is reduced. It is also possible to avoid the problem that the resources dynamically scheduled by the PDCCH are scattered, and to avoid the problem that the scheduled resources are small, thereby reducing the scheduling overhead of the PDCCH and improving the resource use efficiency.

Third Embodiment

Figure 7:
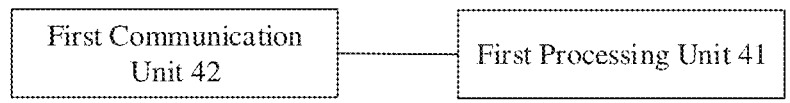
FIG. 7 is a schematic structural diagram of a terminal device according to an embodiment of the present disclosure.

In an embodiment of the present disclosure, a terminal device is provided. As illustrated in FIG. 7, the terminal device includes a first communication unit 41 and a first processing unit 42.

The first communication unit 41 is configured to receive first indication information. The first indication information indicates time domain resources and/or frequency domain resources for preemption transmission, a minimum granularity of the time domain resources is a symbol, and a minimum granularity of the frequency domain resources is a subcarrier or a physical resource block.

The first processing unit 42 is configured to determine, based on the first indication information, available resources for at least one of a first type of service to be transmitted or a second type of service to be transmitted.

The available resources for the second type of service are at least one of: at least part of time domain resources other than the time domain resources for the preemption transmission; or at least part of frequency domain resources other than the frequency domain resources for the preemption transmission. The available resources for the first type of service at least include at least one of: at least part of the time domain resources for the preemption transmission; or at least part of the frequency domain resources for the preemption transmission.

It is also to be noted that the available resources for the first type of service may further include at least part of other non-overlapping time domain resources and/or at least part of other non-overlapping frequency domain resources.

In this embodiment, the first type of service may be a service of a time sensitive network (TSN), a service of an ultra-reliable, low-latency communication (URLLC) type, or a service of another network. The solution of this embodiment is particularly applicable to the service of the TSN network. The second type of service may be at least one of a voice service, a eMBB service, or a TSN service. It is to be noted that the priority of the TSN service in the first type of service is higher than the priority of the TSN service in the second type of service. Or, the QoS requirement for the TSN service in the first type of service is higher than the QoS requirement for the TSN service in the second type of service. Or, the TSN service in the first type of service and the TSN service in the second type of service belong to different categories.

The first communication unit 41 is further configured to acquire the first indication information through one of an RRC message, an MAC CE, and DCI.

The first indication information sent from a network side is received, that is, time domain and/or frequency domain resources for preemption transmission configured by the network for a terminal device are acquired. The time domain and/or frequency domain resources for the preemption transmission are used to indicate preempted (unusable) time and frequency resources among time and frequency resources that have been, or are to be, configured or indicated. The minimum granularity in the granularities of the time domain resource indication may be a symbol level, a slot level, or a subframe level. The minimum granularity among the granularities of the frequency domain resource indication may be at the subcarrier level (SC level) or at the physical resource block level (PRB level). Further, the granularity may be a group level, such as a symbol group level, a subcarrier group level.

The time domain resources and/or the frequency domain resources for the preemption transmission are at least one of: at least part of semi-static resources; or at least part of dynamic resources.

Specifically, the time-domain and/or frequency domain resources for the preemption transmission may be the same as the semi-static resource allocation or may be a part of the semi-static resources, such as an ACK/NACK feedback time and frequency resources corresponding to grant free, time and frequency resources of downlink SPS, or a time and frequency resource of uplink CG. Alternatively, the time domain and/or frequency domain resources for the preemption transmission may be the same as or part of dynamic resources.

In the time domain resources and the frequency domain resources for the preemption transmission, the frequency domain resources for the preemption transmission are at least one of a discontinuous frequency domain resource or a frequency domain resource in which at least one granularity exists; and/or the time domain resources for the preemption transmission are at least one of discontinuous time domain resources, and/or or time domain resources in which at least one granularity exists.

The time domain resources for the preemption transmission may not be continuous, and/or the granularities for the preemption indication may be different, such as symbol 1, symbol 14; or, symbol 1, symbols 4-6.

The frequency domain resources for the preemption transmission may not be continuous, and/or the granularities of the preemption indication may be different, such as, subcarrier 1, subcarriers 2-3; or, subcarrier 1 of PRB1, PRB2.

The first indication information includes at least one of:

a period and a time domain offset of at least one set of time domain resources and/or frequency domain resources for the preemption transmission; or at least one set of transmission resource patterns for the preemption transmission.

It is to be noted that in the first indication information, the time domain resources and the frequency domain resources for the preemption transmission may be respectively indicated by different information elements, or combinations of multiple sets of time domain resources and frequency domain resources may be indicated by the first indication information. For example, the time domain resources for the preemption transmission and the frequency domain resources for the preemption transmission are individually indicated to the terminal device. For example, the base station indicates what resources are occupied in the time domain firstly, then the base station indicates what resources are occupied in the frequency domain. Alternatively, the time domain resources for the preemption transmission and the frequency domain resources for the preemption transmission are indicated as a combination to the terminal device, for example, the base station indicates what resources are occupied in time and frequency domains.

The period and the time domain offset and/or a frequency domain offset of the time domain resources and/or frequency domain resources for the preemption transmission may be indicated by a network side, such as a base station, to a terminal device via the first indication information. Of course, the transmission resource pattern may also be indicated to the terminal device via the first indication information.

For example, in a case that the base station indicates a period and a time domain offset of the resources for the preemption transmission: for SPS configuration, the period is 1 slot, occupied frequency domain resources are PRB 1, the time domain offset is 2 symbols, the time domain length is 2 symbols, and for the preemption indication, the period is 2 slot, occupied frequency domain resources are subcarrier 1 of the PRB 1, time domain offset is 2 symbols, and time domain length is 1 symbols.

For another example, the base station indicates a resource pattern for the preemption transmission, taking a bandwidth 6 PRB as an example:
{PRB}    {SC}    {symbol}:    {1}    {1}
  {001000000000000000000000000}, or
{1}                                              {010000000000}
  {001000000000000000000000000}, or {010000}  {010000000000}
{001000000000000000000000000}, or
{0010000000000000000000000000}.

Further, the first communication unit 41 is further configured to receive a period and/or a time domain offset, or at least one transmission resource pattern, of at least one group resources for the preemption transmission, indicated by the network side. Typically, the base station indicates the period and/or time domain offset, or the transmission resource pattern, of at least one group resources for the preemption transmission through, for example, a dedicated message such as a RRC message or a broadcast message. Alternatively, the base station further indicates, through a dedicated message, such as a MAC CE or a physical layer signaling, the period and/or time domain offset, or the transmission resource pattern, of one or more groups of resources to be finally activated in multiple groups of resources for the preemption transmission.

The time domain resources and/or the frequency domain resources for the preemption transmission indicated in the first indication information are for one of a terminal device, a user group, and a cell. For example, the time domain resources and/or the frequency domain resources for the preemption transmission may be indicated by the base station to the UE by means of group scheduling, such as group x-RNTI.

The first communication unit 41 is further configured to receive the time domain and/or frequency domain resource configuration for the preemption transmission configured by the network. The first communication unit 41 receives a dedicated signaling, such as at least one of an RRC message, an MAC CE or DCI, from the network to obtain time domain and frequency domain resource configuration for the preemption transmission.

Further, the first communication unit 41 is further configured to acquire a period and/or time domain offset, or a transmission resource pattern, of resources for the preemption transmission. Similarly, the first communication unit 41 is further configured to acquire the period and/or the time domain offset, or the transmission resource pattern, of resources for the preemption transmission through, for example, a dedicated message such as an RRC message or a broadcast message.

The first communication unit 41 is further configured to receive second indication information. The second indication information indicates or includes one or more sets of time domain resources and/or frequency domain resources to be activated for the preemption transmission.

The first communication unit 41 is further configured to acquire the second indication information through one of an RRC message, an MAC CE, or DCI.

The first processing unit 42 is further configured to determine the available resources for the second type of service to be transmitted from resources other than the at least one set of time domain resources to be activated and/or frequency domain resources to be activated for the preemption transmission indicated in the second indication information.

That is, an actual preempted time and frequency resource or an actually preempted resource pattern may be acquired through a dedicated message, such as an MAC CE or a physical layer signaling.

In combination, the first indication information is acquired through, for example, the dedicated message such as an RRC message or a broadcast message, and though the first indication information, the period and/or the time domain offset, or the transmission resource pattern, of at least one group of resources for the preemption transmission configured by the network side may be acquired. For example, the index of each group is also carried in the RRC message or the broadcast message.

The second indication information is acquired through an dedicated message, such as an MAC CE or a physical layer signaling, and through the second indication information, a period and/or time domain offset of one or more sets of resources to be activated finally for the preemption transmission in the at least one set of transmission resources included in the first indication information may be determined. Alternatively, through the second indication information, a transmission resource pattern to be activated or to be used is determined from the at least one transmission resource pattern included in the first indication information. For example, the index to be activated finally may be carried in the MAC CE or the physical layer signaling.

It is to be noted that the network device may indicate only the first indication information, and the first processing unit 42 of the terminal device acquires information about time domain resources and/or frequency domain resources, or a transmission pattern, for the preemption transmission according to the first indication information, and determines available resources for the second type of service to be transmitted outside the resources for the preemption transmission.

Further, the first communication unit 41 may be further configured to receive second indication information, and the first processing unit 42 may be further configured to determine the available resources of the first type of service to be transmitted.

As illustrated in FIG. 4, an alternative example of an activation indication method using the MAC CE is shown. In FIG. 4, Idi represents a period and a time domain offset of the group of preemption transmission resources of which the index is i, or a transmission resource pattern of which the index is i.

Here, a new logical channel identification (LCID) is introduced to indicate that the function of the MAC CE is to indicate the period and time domain offset, or the transmission resource pattern, of the resources to be activated/deactivated for the preemption transmission. The value at each position indicates whether the corresponding resources for the preemption transmission are to be activated, and the activation or deactivation corresponding to the specific value may be set according to the actual situation. For example, it may be set that when the value at the corresponding position is 1, it may indicate that the corresponding resources are to be activated or to be actually used, or that the corresponding resources are to be preempted, and when the value at the corresponding position is 0, it may represent that the corresponding resources are to be deactivated, or not to be actually used, or that the corresponding resources are not to be preempted.

It is also to be noted that the at least one group of the time domain resources to be activated and/or frequency domain resources to be activated for the preempt transmission in the second indication information is for one of a terminal device, a user group, or a cell. Details are not described herein.

Further, the resources available for the current transmission may be determined according to the time domain and frequency domain resource configuration for the preemption transmission configured and/or indicated in the second indication information. The available resources for the current transmission are some or all of the resources other than the preemption indication. Whether the current position is used for transmission may be determined based on whether the configured CG/SPS position, the position for transmitting the eMBB PUCCH, or the already indicated dynamically scheduled position is preempted. If preempted, the resource transmission may be performed in a manner such as the puncture/rate-matching/pre-emption. If not preempted, the transmission may be performed according to the position of the configured CG/SPS or the position for transmitting the eMBB PUCCH, the resources indicated by the dynamic scheduling. For example, if some of the CG/SPS resources configured for the voice service of the UE1 are determined to be preempted according to the first indication information and/or the second indication information, the remaining CG/SPS resources other than the resources to be preempted are available resources for the current transmission, and the UE1 transmits the voice service in a manner such as the puncture/rate-matching/pre-emption. For another example, if some of the resources dynamically scheduled for the eMBB service of the UE2 are preempted according to the first indication information and/or the second indication information, the remaining resources dynamically scheduled other than the resources to be preempted are available resources for current transmission, and the UE2 transmits the eMBB service in a manner such as the puncture/rate-matching/pre-emption.

Based on the foregoing solution, in the present embodiment, the third indication information may further be acquired through one of an RRC message, an MAC CE, or DCI. In particular, the first communication unit 41 is configured to receive the third indication information. The third indication information indicates activation moments or starting use moments for at least one of: the time domain resources and/or the frequency domain resources for the preemption transmission; or the at least one set of time domain resources to be activated and/or frequency domain resources to be activated for the preemption transmission.

That is, in addition to configuring the time domain resource and/or the frequency domain resource through the first indication information, and/or indicating the time domain resource to be activated or used and/or the frequency domain resource to be activated or used through the second indication information, the starting use moments for the resources indicated in the first indication information may be indicated or indicated individually though the third indication information, and/or the activation starting moments for one or more sets of time domain/frequency domain resources indicated in the second indication information may indicated though the third indication information. For example, the first indication information indicates the time domain resources 1, 2, and 3, and the frequency domain resources 1, 2, and 3. Then, the third indication information indicates the starting use moments for the time domain resources 1, 2, and 3, and the starting use moments of the frequency domain resources 1, 2, and 3, respectively. Alternatively, if the second indication information indicates that the time domain resource 1 and the frequency domain resource 1 are to be activated, the activation start moments for the time domain resource 1 and the frequency domain resource 1 may be indicated by the third indication information. In combination with the third indication information, the activation moment or starting use moment for each time domain resource and/or frequency domain resource for the preemption transmission can be obtained more clearly, so that the time domain and/or frequency domain transmission positions of available resources can be determined more accurately.

The resources with the activation moments or starting use moments indicated in the third indication information are also for one of the terminal device, the user group, or the cell.

It can be seen that with the above solution, it is possible to obtain positions of time domain resources and/or frequency domain resources for the preemption transmission with a smaller granularity, and further determine available resources for transmission of the second type of service based on the positions of time domain resources and/or frequency domain resources for the preemption transmission. In this way, by indicating the positions of the time domain resource and/or the frequency domain resource for the preemption transmission at one time, the problem of redundancy indication caused by frequent preemption indication is avoided, and unnecessary resource waste is reduced. It is also possible to avoid the problem that the resources dynamically scheduled by the PDCCH are scattered, and to avoid the problem that the scheduled resources are small, thereby reducing the scheduling overhead of the PDCCH and improving the resource use efficiency.

Fourth Embodiment

Figure 8:
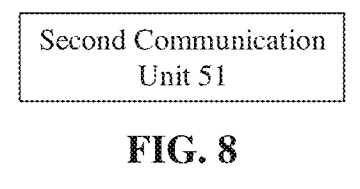

In an embodiment of the present disclosure, a network device is provided. As illustrated in FIG. 8, the network device includes a second communication unit 51.

The second communication unit 51 is configured to transmit first indication information. The first indication information indicates time domain resources and/or frequency domain resources for preemption transmission. The minimum granularity of the time domain resources is a symbol, and the minimum granularity of the frequency domain resources is a subcarrier or a physical resource block.

In this embodiment, a first type of service may be a service of a time sensitive network (TSN), a service of an ultra-reliable, low-latency communication (URLLC) type, or a service of another network. The solution of this embodiment is particularly applicable to the service of the TSN network. A second type of service may be at least one of a voice service, a eMBB service, or a TSN service. It is to be noted that the priority of the TSN service in the first type of service is higher than the priority of the TSN service in the second type of service. Or, the QoS requirement for the TSN service in the first type of service is higher than the QoS requirement for the TSN service in the second type of service. Or, the TSN service in the first type of service and the TSN service in the second type of service belong to different categories.

The second communication unit 51 is further configured to transmit the first indication information through one of an RRC message, an MAC CE, or DCI.

The second communication unit 51 is configured to configure time domain and/or frequency domain resources for the preemption transmission for the terminal device. The time domain and/or frequency domain resources for the preemption transmission are used to indicate preempted (unusable) time and frequency resources in time and frequency resources that have been, or are to be, configured or indicated. The minimum granularity among the granularities of the time domain resource indication may be a symbol level, a slot level, or a subframe level. The minimum granularity among the granularities of the frequency domain resource indication may be at the subcarrier level (SC level) or at the physical resource block level (PRB level). Further, the granularity may be a group level, such as a symbol group level, a subcarrier group level.

The time domain resources and/or the frequency domain resources for the preemption transmission are at least one of: at least part of semi-static resources; or at least part of dynamic resources.

Specifically, the time domain and/or frequency domain resources for the preemption transmission may be the same as the semi-static resource allocation or may be a part of the semi-static resources, such as an ACK/NACK feedback time and frequency resources corresponding to grant free, time and frequency resources of downlink SPS, or time and frequency resources of uplink CG. Alternatively, the time domain and/or frequency domain resources for the preemption transmission may be the same as or part of dynamic resources.

In the time domain resources and the frequency domain resources for the preemption transmission, the frequency domain resources for the preemption transmission are at least one of a discontinuous frequency domain resource or a frequency domain resource in which at least one granularity exists; and/or the time domain resources for the preemption transmission are at least one of discontinuous time domain resources, and/or or time domain resources in which at least one granularity exists.

The time domain resources for the preemption transmission may not be continuous, and/or the granularities for the preemption indication may be different, such as symbol 1, symbol 14; or, symbol 1, symbols 4-6.

The frequency domain resources for the preemption transmission may not be continuous, and/or the granularities of the preemption indication may be different, such as, subcarrier 1, subcarriers 2-3; or, subcarrier 1 of PRB1, PRB2.

The first indication information includes at least one of:

a period and a time domain offset of at least one set of time domain resources and/or frequency domain resources for the preemption transmission; or at least one set of transmission resource patterns for the preemption transmission.

It is to be noted that in the first indication information, the time domain resources and the frequency domain resources for the preemption transmission may be respectively indicated by different information elements, or combinations of multiple sets of time domain resources and frequency domain resources may be indicated by the first indication information. For example, the time domain resources for the preemption transmission and the frequency domain resources for the preemption transmission are individually indicated to the terminal device. For example, the base station indicates what resources are occupied in the time domain firstly, then the base station indicates what resources are occupied in the frequency domain. Alternatively, the time domain resources for the preemption transmission and the frequency domain resources for the preemption transmission are indicated as a combination to the terminal device, for example, the base station indicates what resources are occupied in time and frequency domains.

The period and the time domain offset and/or a frequency domain offset of the time domain resources and/or frequency domain resources for the preemption transmission may be indicated by a network side, such as a base station, to the terminal device via the first indication information. Of course, the transmission resource pattern may also be indicated to the terminal device via the first indication information.

For example, in a case that the base station indicates that a period and a time domain offset of the resources for the preemption transmission: for SPS configuration, the period is 1 slot, occupied frequency domain resources are PRB1, the time domain offset is 2 symbols, the time domain length is 2 symbols, and for the preemption indication, the period is 2slot, occupied frequency domain resources are subcarrier 1 of the PRB1, time domain offset is 2 symbols, and time domain length is 1 symbols.

For another example, the base station indicates a resource pattern for the preemption transmission, taking a bandwidth 6 PRB as an example:
{PRB}    {SC}    {symbol}:    {1}    {1} {001000000000000000000000000}, or
{1}    {010000000000} {001000000000000000000000000}, or
{010000}    {010000000000} {001000000000000000000000000},    or {001000000000000000000000000}.

Further, optionally, the network side indicates: for example, a period and/or a time domain offset, or at least one transmission resource pattern, of at least one group resources for the preemption transmission. Typically, the base station indicates the period and/or time domain offset, or the transmission resource pattern, of at least one group resources for the preemption transmission through, for example, a dedicated message such as a RRC message or a broadcast message. Alternatively, the base station further indicates, through a dedicated message, such as a MAC CE and a physical layer signaling, the period and/or time domain offset, or the transmission resource pattern, of one or more groups of resources to be finally activated in multiple groups of resources for the preemption transmission.

The time domain resources and/or the frequency domain resources for the preemption transmission indicated in the first indication information are for one of a terminal device, a user group, and a cell. For example, the time domain resources and/or the frequency domain resources for the preemption transmission may be indicated by the base station to the UE by means of group scheduling, such as group x-RNTI.

The second communication unit 51 is further configured to transmit second indication information. The second indication information indicates or includes one or more sets of time domain resources and/or frequency domain resources to be activated for the preemption transmission.

The second communication unit 51 is further configured to transmit the second indication information through one of an RRC message, an MAC CE, and DCI.

For transmission resource pattern, for example, the index to be activated finally may be carried in a MAC CE or a physical layer signaling.

As illustrated in FIG. 4, an alternative example of an activation indication method using the MAC CE is shown. In FIG. 4, Idi represents a period and a time domain offset of the group of preemption transmission resources of which the index is i, or a transmission resource pattern of which the index is i.

Here, a new logical channel identification (LCID) is introduced to indicate that the function of the MAC CE is to indicate the period and time domain offset, or the transmission resource pattern, of the resources to be activated/deactivated for the preemption transmission. The value at each position indicates whether the corresponding resources for the preemption transmission are to be activated, and the activation or deactivation corresponding to the specific value may be set according to the actual situation. For example, it may be set that when the value at the corresponding position is 1, it may indicate that the corresponding resources are to be activated or to be actually used, or that the corresponding resources are to be preempted, and when the value at the corresponding position is 0, it may represent that the corresponding resources are to be deactivated, or not to be actually used, or that the corresponding resources are not to be preempted.

It is also to be noted that the at least one group of the time domain resources to be activated and/or frequency domain resources to be activated for the preempt transmission in the second indication information is for one of a terminal device, a user group, and a cell. Details are not described herein.

Based on the foregoing solution, in the present embodiment, third indication information may further be transmitted through one of an RRC message, an MAC CE, and DCI. In particular, the second communication unit 51 is further configured to transmit the third indication information. The third indication information indicates activation moments or starting use moments for at least one of: the time domain resources and/or the frequency domain resources for the preemption transmission; or the at least one set of time domain resources to be activated and/or frequency domain resources to be activated for the preemption transmission.

That is, in addition to configuring the time domain resource and/or the frequency domain resource through the first indication information, and then indicating the time domain resource to be activated or used and/or the frequency domain resource to be activated or used through the second indication information, the starting use moments for the resources indicated in the first indication information may be indicated respectively though the third indication information, and/or the activation starting moments for one or more sets of time domain/frequency domain resources indicated in the second indication information may indicated though the third indication information. For example, the first indication information indicates the time domain resources 1, 2, and 3, and the frequency domain resources 1, 2, and 3. Then, the third indication information indicates the starting use moments for the time domain resources 1, 2, and 3, and the starting use moments of the frequency domain resources 1, 2, and 3, respectively. Alternatively, if the second indication information indicates that the time domain resource 1 and the frequency domain resource 1 are to be activated, the activation start moments for the time domain resource 1 and the frequency domain resource 1 may be indicated by the third indication information. In combination with the third indication information, the activation moment or starting use moment for each time domain resource and/or frequency domain resource for the preemption transmission can be obtained more clearly, so that the time domain and/or frequency domain transmission positions of available resources can be determined more accurately.

The resources with the activation moments or starting use moments indicated in the third indication information are also for one of the terminal device, the user group, or the cell.

It can be seen that with the above solution, it is possible to obtain positions of time domain resources and/or frequency domain resources for the preemption transmission with a smaller granularity, and further determine available resources for transmission of the second type of service based on the positions of time domain resources and/or frequency domain resources for the preemption transmission. In this way, by indicating the positions of the time domain resource and/or the frequency domain resource for the preemption transmission at one time, the problem of redundancy indication caused by frequent preemption indication is avoided, and unnecessary resource waste is reduced. It is also possible to avoid the problem that the resources dynamically scheduled by the PDCCH are scattered, and to avoid the problem that the scheduled resources are small, thereby reducing the scheduling overhead of the PDCCH and improving the resource use efficiency.

Figure 9:
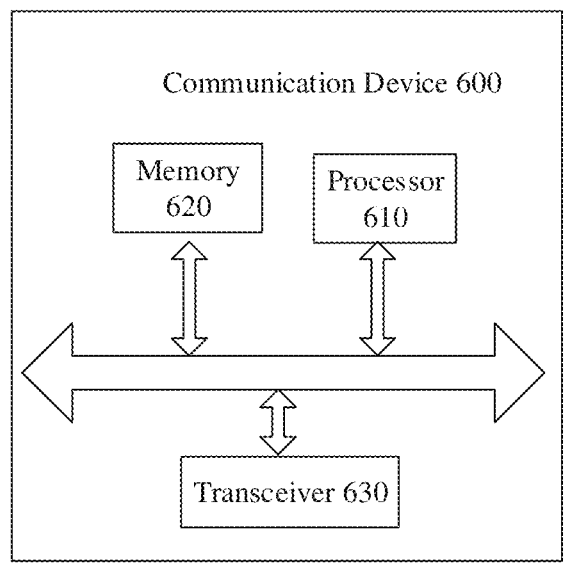
FIG. 9 is a schematic structural diagram of a communication device according to an embodiment of the present disclosure.

FIG. 9 is a schematic block diagram of a communication device 600 according to an embodiment of the present disclosure. The communication device may be a terminal device or a network device according to the embodiment. The communication device 600 illustrated in FIG. 9 includes a processor 610 that can call and run a computer program from a memory to implement the method in an embodiment of the present disclosure.

Optionally, as illustrated in FIG. 9, the communication device 600 may also include a memory 620. Therein, the processor 610 may call and run a computer program from the memory 620 to implement the method in the embodiments of the present disclosure.

The memory 620 may be a separate device independent of the processor 610, or may be integrated in the processor 610.

Optionally, as illustrated in FIG. 9, the communication device 600 may also include a transceiver 630 that may be controlled by the processor 610 to communicate with other devices, specifically, may transmit information or data to other devices or receive information or data transmitted by other devices.

The transceiver 630 may include a transmitter and a receiver. The transceiver 630 may further include an antenna, and the number of antennas may be one or more.

Optionally, the communication device 600 may be specifically a network device according to an embodiment of the present disclosure, and the communication device 600 may implement a corresponding flow implemented by the network device in various methods according to the embodiments of the present disclosure. For brevity, details are not described herein.

Optionally, the communication device 600 may be specifically a terminal device or a network device according to an embodiment of the present disclosure, and the communication device 600 may implement a corresponding flow implemented by a mobile terminal/terminal device in various methods according to the embodiments of the present disclosure. For brevity, details are not described herein.

Figure 10:
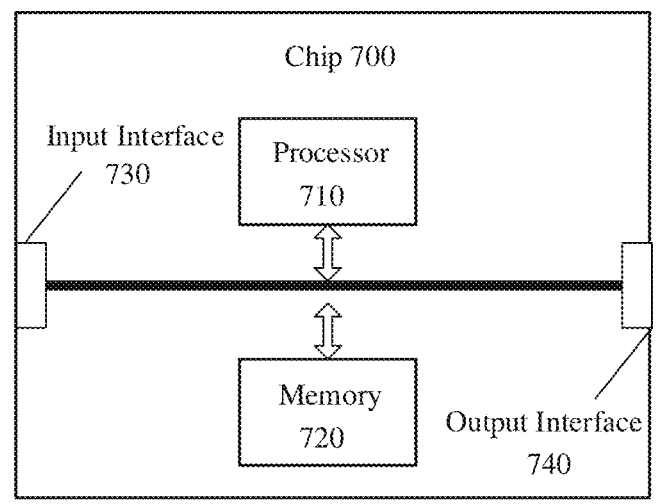
FIG. 10 is a schematic block diagram of a chip according to an embodiment of the present disclosure.

FIG. 10 is a schematic block diagram of a chip according to an embodiment of the present disclosure. The chip 700 illustrated in FIG. 10 includes a processor 710 that can call and run a computer program from memory to implement the methods in embodiments of the present disclosure.

Alternatively, as illustrated in FIG. 10, the chip 700 may also include a memory 720. The processor 710 may call and run a computer program from the memory 720 to implement the method in the embodiments of the present disclosure.

The memory 720 may be a separate device independent of the processor 710, or may be integrated in the processor 710.

Optionally, the chip 700 may also include an input interface 730. The processor 710 may control the input interface 730 to communicate with other devices or chips, and specifically, may acquire information or data transmitted by other devices or chips.

Optionally, the chip 700 may also include an output interface 740. The processor 710 may control the output interface 740 to communicate with other devices or chips, and specifically may output information or data to other devices or chips.

Optionally, the chip may be applied to the network device in the embodiment of the present disclosure, and the chip may implement a corresponding flow implemented by the network device in the various methods in the embodiments of the present disclosure. For brevity, details are not described herein.

Optionally, the chip may be applied to the terminal device in the embodiment of the present disclosure, and the chip may implement a corresponding flow realized by the terminal device in various methods in the embodiments of the present disclosure. For brevity, details are not described herein.

It is to be understood that the chips mentioned in the embodiments of the present disclosure may also be referred to as system-level chips, system chips, chip systems or system-on-chip chips.

Figure 11:
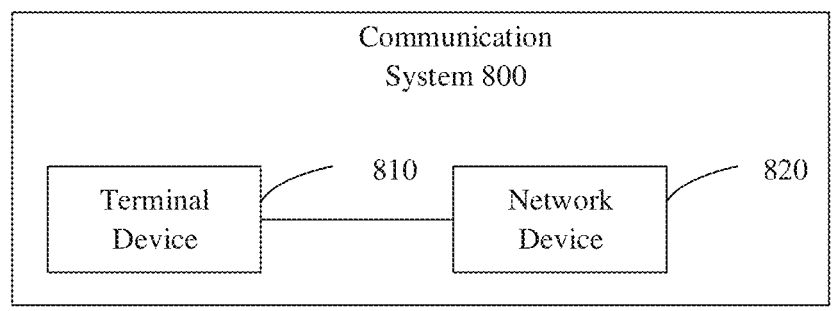
FIG. 11 is a second schematic diagram of a communication system architecture according to an embodiment of the present disclosure.

FIG. 11 is a schematic block diagram of a communication system 800 according to an embodiment of the present disclosure. As illustrated in FIG. 11, the communication system 800 includes a terminal device 810 and a network device 820.

Here, the terminal device 810 may be used to implement the corresponding functions implemented by the terminal device in the above method, and the network device 820 may be used to implement the corresponding functions implemented by the network device in the above method. For brevity, details are not described herein.

It is to be understood that the processor of an embodiment of the present disclosure may be an integrated circuit chip having signal processing capabilities. In implementation, the operations of the above-described method embodiments may be accomplished by integrated logic circuits of hardware in the processor or instructions in the form of software. The processors described above may be general purpose processors, Digital Signal Processor (DSP), Application Specific Integrated Circuit (ASIC), Field Programmable Gate Array (FPGA) or other programmable logic devices, discrete gate or transistor logic devices, discrete hardware components. The methods, operations, and logical block diagrams disclosed in the embodiments of the present disclosure may be implemented or performed. The general purpose processor may be a microprocessor or the processor may be any conventional processor or the like. The operations of the method disclosed with reference to the embodiment of the present disclosure may be directly performed by a hardware decoding processor, or performed by a combination of hardware and software modules in the decoding processor. The software module may be located in a storage medium mature in the art such as a random access memory, a flash memory, a read-only memory, a programmable read-only memory, or an electrically erasable programmable memory, a register, or the like. The storage medium is located in a memory, and the processor reads information in the memory and performs the operations of the above method in conjunction with its hardware.

It is to be understood that the memory in embodiments of the present disclosure may be volatile memory or non-volatile memory, or may include both volatile and non-volatile memory. The non-volatile memory may be Read-Only Memory (ROM), Programmable ROM (PROM), Erasable PROM (EPROM), Electrically EPROM (EEPROM), or flash memory. The volatile memory may be a Random Access Memory (RAM), which functions as an external cache. By way of example, and not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memories of the systems and methods described herein are intended to include, but are not limited to, these and any other suitable types of memories.

It is to be understood that the above memory is exemplary, but not limiting, and that the memory in the embodiments of the present disclosure may also be a static RAM (SRAM), a dynamic RAM (DRAM), a synchronous DRAM (SDRAM), a double data rate SDRAM (double data rate SDRAM, DDR SDRAM), an enhanced SDRAM (ESDRAM), a synch link DRAM (SLDRAM), a Direct Rambus RAM (DR RAM), or the like. That is, the memory in the embodiments of the present disclosure is intended to include, but is not limited to, these and any other suitable types of memory.

An embodiment of the present disclosure further provides a computer readable storage medium for storing a computer program.

Optionally, the computer-readable storage medium may be applied to the network device in the embodiments of the present disclosure, and the computer program causes the computer to execute the corresponding flow implemented by the network device in the various methods in the embodiments of the present disclosure. For brevity, details are not described herein.

Optionally, the computer-readable storage medium may be applied to the terminal device in the embodiments of the present disclosure, and the computer program causes the computer to execute the corresponding flow implemented by the mobile terminal/terminal device in the various methods in the embodiments of the present disclosure, and details are not described herein for brevity.

An embodiment of the present disclosure further provides a computer program product including computer program instructions.

Optionally, the computer program product may be applied to the network device in the embodiments of the present disclosure, and the computer program instructions cause the computer to execute the corresponding flow implemented by the network device in the various methods in the embodiments of the present disclosure. For brevity, details are not described herein.

Optionally, the computer program product may be applied to the mobile terminal/terminal device in the embodiments of the present disclosure, and the computer program instructions cause the computer to execute the corresponding flows implemented by the mobile terminal/terminal device in the various methods in the embodiments of the present disclosure. For brevity, details are not described herein.

The embodiment of the present disclosure also provides a computer program.

Optionally, the computer program may be applied to the network device in the embodiments of the present disclosure. When the computer program is run on a computer, the computer is enabled to execute the corresponding flow implemented by the network device in the various methods in the embodiments of the present disclosure. For brevity, details are not described herein.

Optionally, the computer program may be applied to the mobile terminal/terminal device in the embodiment of the present disclosure, and when the computer program is run on a computer, the computer is caused to execute the corresponding flow implemented by the mobile terminal/terminal device in the various methods in the embodiments of the present disclosure. For brevity, details are not described herein.

With the above solution, it is possible to obtain positions of time domain resources and/or frequency domain resources for the preemption transmission with a smaller granularity, and further determine available resources for transmission of the second type of service based on the positions of time domain resources and/or frequency domain resources for the preemption transmission. In this way, by indicating the positions of the time domain resource and/or the frequency domain resource for the preemption transmission at one time, the problem of redundancy indication caused by frequent preemption indication is avoided, and unnecessary resource waste is reduced. It is also possible to avoid the problem that the resources dynamically scheduled by the physical downlink control channel (PDCCH) are scattered, and to avoid the problem that the scheduled resources are small, thereby reducing the scheduling overhead of the PDCCH and improving the resource use efficiency.

Those of ordinary skill in the art will recognize that the elements and algorithm operations of the examples described with reference to the embodiments disclosed herein can be implemented in electronic hardware, or a combination of computer software and electronic hardware. Whether these functions are performed in hardware or software depends on the particular application and design constraints of the solution. The skilled artisan may use different methods to implement the described functions for each particular application, but such implementation should not be considered to be outside the scope of the present disclosure.

It will be apparent to those skilled in the art that for the convenience and brevity of the description, reference may be made to the corresponding processes in the foregoing method embodiments for the specific working procedures of the above-described systems, apparatuses and units, and details will not be described herein.

In the several embodiments provided herein, it is to be understood that the disclosed systems, apparatus, and methods may be implemented in other ways. For example, the device embodiments described above are merely illustrative, for example, the division of the units is merely a logical functional division, and there may be additional division in practice, for example, a plurality of units or components may be combined or integrated into another system, or some features may be ignored or not performed. On the other hand, the coupling or direct coupling or communication connection between each other illustrated or discussed may be through some interface, indirect coupling or communication connection of a device or unit, and may be in electrical, mechanical or other form.

The elements illustrated as separate elements may or may not be physically separate, and the elements illustrated as elements may or may not be physical elements, may be located at one location, or may be distributed across multiple network elements. Some or all of the elements may be selected according to actual needs to achieve the objectives of the embodiments.

In addition, the functional units in the various embodiments of the present disclosure may be integrated in one processing unit, may be separate physical units, or may be integrated in two or more units.

The functions, if implemented as software functional units and sold or used as separate products, may be stored in a computer-readable storage medium. On the basis of such an understanding, the technical solution of the present disclosure essentially or the part that contributes to the prior art or the part of the technical solution can be embodied in the form of a software product, which is stored in a storage medium and includes instructions for causing a computer device (which may be a personal computer, a server, a network device, or the like) to perform all or part of the steps of the methods described in the various embodiments of the present disclosure. The aforementioned storage medium includes a USB flash drive, a removable hard disk, Read-Only Memory (ROM), Random Access Memory (RAM), a magnetic disk, an optical disk or other media that can store program codes.

The foregoing description is merely illustrative of the embodiments of the present disclosure, but the scope of protection of the present disclosure is not limited thereto. Variations or substitutions may readily occur to those skilled in the art within the technical scope of the present disclosure, and are intended to be included within the scope of protection of the present disclosure. Accordingly, the scope of the present disclosure should be described with reference to the scope of the claims.

The invention claimed is:

1. A method for resource indication, applied to a terminal device, the method comprising:
receiving first indication information, wherein the first indication information indicates time domain resources and/or frequency domain resources for preemption transmission, a minimum granularity of the time domain resources is a symbol, a minimum granularity of the frequency domain resources is a subcarrier or a physical resource block, and the time domain resource and/or the frequency domain resource for the preemption transmission indicated in the first indication information are for a cell; and
determining, based on the first indication information, available resources for a first type of service to be transmitted,
wherein the available resources for the first type of service are at least one of:
at least part of time domain resources other than the time domain resources for the preemption transmission; or
at least part of frequency domain resources other than the frequency domain resources for the preemption transmission,
wherein the method further comprises:
receiving second indication information, wherein the second indication information indicates starting use moments of the time domain resources for the preemption transmission, and resources with the starting use moments indicated in the second indication information are for a cell.

2. The method of claim 1, wherein the time domain resources and/or the frequency domain resources for the preemption transmission are at least one of:
at least part of semi-static resources; or
at least part of dynamic resources.

3. The method of claim 1, wherein the first indication information comprises at least one of:
a time domain offset of at least one set of time domain resources and/or frequency domain resources for the preemption transmission; or
at least one set of transmission resource patterns for the preemption transmission.

4. A method for resource indication, applied to a network device, the method comprising:
transmitting first indication information, wherein the first indication information indicates time domain resources and/or frequency domain resources for preemption transmission, a minimum granularity of the time domain resources is a symbol, a minimum granularity of the frequency domain resources is a subcarrier or a physical resource block, and the time domain resource and/or the frequency domain resource for the preemption transmission indicated in the first indication information are for a cell, wherein the method further comprises:

transmitting second indication information, wherein the second indication information indicates starting use moments of the time domain resources for the preemption transmission, and resources with the starting use moments indicated in the second indication information are for a cell.

5. The method of claim 4, wherein the time domain resources and/or the frequency domain resources for the preemption transmission are at least one of:

at least part of semi-static resources; or at least part of dynamic resources.

6. The method of claim 4, wherein the first indication information comprises at least one of:

a time domain offset of at least one set of time domain resources and/or frequency domain resources for the preemption transmission; or at least one set of transmission resource patterns for the preemption transmission.

7. A terminal device comprising:

a transceiver;

a processor; and a memory for storing a computer program executable by the processor, wherein the processor is configured to receive first indication information via the transceiver, wherein the first indication information indicates time domain resources and/or frequency domain resources for preemption transmission, a minimum granularity of the time domain resources is a symbol, a minimum granularity of the frequency domain resources is a subcarrier or a physical resource block, and the time domain resource and/or the frequency domain resource for the preemption transmission indicated in the first indication information are for a cell; and determine, based on the first indication information, available resources for a first type of service to be transmitted, wherein the available resources for the first type of service are at least one of:

at least part of time domain resources other than the time domain resources for the preemption transmission; or at least part of frequency domain resources other than the frequency domain resources for the preemption transmission, wherein the processor is further configured to receive second indication information, wherein the second indication information indicates starting use moments of the time domain resources for the preemption transmission, and resources with the starting use moments indicated in the second indication information are for a cell.

8. The terminal device of claim 7, wherein the time domain resources and/or the frequency domain resources for the preemption transmission are at least one of:

at least part of semi-static resources; or at least part of dynamic resources.

9. The terminal device of claim 7, wherein the first indication information comprises at least one of:

a time domain offset of at least one set of time domain resources and/or frequency domain resources for the preemption transmission; or at least one set of transmission resource patterns for the preemption transmission.

* * * * *